Oct. 21, 1969 S. P. CHUR 3,474,331

MAGNETIC RECORDING MEDIUM TESTING APPARATUS

Filed June 16, 1967 3 Sheets-Sheet 1

INVENTOR
SUNG PAL CHUR

BY Wilson, Robbins & Anderson
ATTORNEYS

MAGNETIC RECORDING MEDIUM TESTING APPARATUS

Filed June 16, 1967 3 Sheets-Sheet 2

INVENTOR
SUNG PAL CHUR

BY Wilson, Robbins & Anderson
ATTORNEYS

INVENTOR
SUNG PAL CHUR

BY Wilson, Robbins & Anderson
ATTORNEYS

United States Patent Office 3,474,331

Patented Oct. 21, 1969

3,474,331

MAGNETIC RECORDING MEDIUM TESTING APPARATUS

Sung Pal Chur, 853 W. Beach Ave., Inglewood, Calif. 90302

Filed June 16, 1967, Ser. No. 646,548
Int. Cl. G01r *33/00, 33/12;* G11b *5/00*
U.S. Cl. 324—34 10 Claims

ABSTRACT OF THE DISCLOSURE

An apparatus for testing the recording medium on a member, both for reliability in recording and for freedom from production of spurious signals. Each recording channel on the member is segmented into alternating sections that are erased clean and recorded with a signal. The recorded sections are then sensed for "dropout" recording errors (signal loss) and also to provide a reference amplitude for comparison against spurious "pickup" signals produced from an adjacent erased section. The apparatus is self controlled to test each recording channel of a magnetic medium for "pickup" and "dropout" errors to a predetermined standard established with consideration for the many variable factors. Boundary areas between sections are omitted from consideration and are tested during a repeat interval in which the sections are offset from their previous positions.

BACKGROUND OF THE INVENTION

In recent years, magnetic recording medium in various structural forms has come into exceedingly widespread use. A considerable quantity of this medium is employed in computer and data-processing applications. These applications normally involve high-density recording in which errors can be expensive and even catastrophic. As a result, the recording medium used must meet rather stringent minimal standards. In this regard, some of the most exacting standards in magnetic recording are for random-access memories employing a magnetic drum or disk. In general, over the years these structures have encountered ever-increasing popularity. As a result, the present market requirements for magnetic recording disks, for example, demand a substantial and continuous production. Of course, after these units are manufactured, they must be tested to certain standards as indicated. Therefore, production capability is somewhat related to test, or quality-control capability.

In general, a record member bearing a satisfactory magnetic recording medium must reproduce recorded signals faithfully and must not produce spurious or unwanted signals, above a predetermined amplitude level. Conventional testing techniques therefore involve first recording signals on the medium then sensing the recorded signals to detect any "dropout" errors that may be present. Additionally, the recording medium is neutralized or erased and then sensed for "pickup" of spurious signals. A magnetic disk or other recording member which is indicated to be relatively free from either "dropout" or "pickup" is satisfactory for actual use. However, a very significant problem lies in establishing and testing disks to a tolerable standard.

Of course, the detailed methods of testing in the past have varied within wide limits. In general, one prior testing technique for magnetic recording disks involved fully recording a channel with a continuous alternating-current pattern, that could be sensed as an average-peak or envelope signal. Dropout errors are then indicated by a drop in signal level below a predetermined threshold. This and other techniques have been somewhat satisfactory in the past, in spite of the fact that a magnetic recording disk is a variable-speed apparatus. That is, with respect to disk records, relative motion between the medium and the recording-writing head or transducer varies significantly depending upon the radial displacement from the disk center of the area being sensed.

Although dropout tests can be performed relatively satisfactorily utilizing prior apparatus, testing for pickup spurious signals developed from the recording medium have presented a considerable problem. Specifically, there is no simple, relatively economical means for providing an error threshold level for comparison with spurious signals to establish a standard. In view of this difficulty, prior techniques have involved analysis of potentially-defective areas on the disk by an operator working with an oscilloscope to provide a visual pattern. Of course, such tests are exceedingly expensive and time-consuming. Other techniques and equipment have employed a plurality of heads or transducers; however, such apparatus is also complex and expensive. Therefore, a considerable need exists for an apparatus to test magnetic recording disks, recognizing that tolerable ratios of maximum to minimum signal strength may exceed a value of ten. Furthermore, a considerable need exists for such an apparatus which is relatively economical to construct and use. Specifically, the apparatus should have the capacity: to test recorded signals to lie within a prescribed range of amplitude; to sense defects manifested by abrupt changes in signal amplitude in relation to adjacent amplitudes; and to sense defects productive of random signals or noise which exceed a threshold amplitude that coincides to a recorded signal at the specific location of the record that is under consideration.

SUMMARY OF THE INVENTION

In general, the structure hereof operates to record a memory track or channel with a continuous sequence of alternating erased sections and recorded sections, which track is then sensed to provide an analytical signal. The representations of the recorded sections are considered for drop-out, as by detecting sharp changes in the signal envelope. Representations of the erased sections are observed for indications of pickup defects. The amplitude standard for this observation is established from a preceding recorded section of the channel. As a result, the amplitude standard for establishing a rejection (on the basis of pickup defects) is closely related to the position in which the defect is detected thereby record speed is considered, as well as the numerous other progressive variables.

During the test operation, boundary areas between recorded sections and erased sections are omitted from consideration by the system. Tests are then repeated for the purpose of covering boundary areas with an offset recording pattern and also for applying the test for pickup defect and dropout defect to the alternate areas to render the test comprehensive. The structure also incorporates automatic control apparatus for progressively testing the channels of an entire disk or other record or alternatively manifesting a defect to indicate a disk is a reject.

DESCRIPTION OF THE PREFERRED EMBODIMENTS

Figure 1:
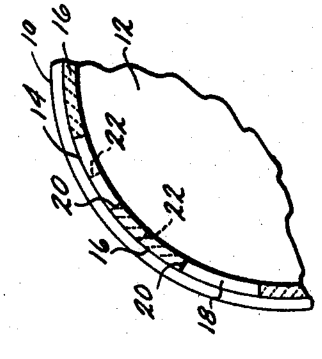
FIGURE 1 is a fragmentary plan and diagrammatic representation of a magnetic recording disk surface illustrating the testing technique of the present system.

Referring initially to FIGURE 1, there is shown a fragment of disk 10 of the type satisfactory for test by the system hereof. Of course, the actual records to be tested may take a wide variety of different forms; however, in the specific illustrative embodiment disclosed herein, the record is in the form of a flat recording disk substantially as shown and described in United States Patent 3,176,281, issued Mar. 30, 1965, to R. E. Pattison.

The flat surface 12 of the disk 10 may be divided into a plurality of concentric annular recording channels, for the storage of data signals. Various techniques are well known and widely incorporated in machines, which locate a specific area on the surface 12 in accordance with a specified address either to read or write information signals in the specified location. Structure for accomplishing these functions is shown and described in United States Patent 3,057,970, issued Oct. 9, 1962, to R. K. Brunner.

Although the disk 10 (FIGURE 1) carries a substantial number of annular tracks or channels on the surface 12, for purposes of explanation a single channel 14 is illustratively indicated. Of course, each of the several channels must be individually tested; however, a consideration of the representative channel 14 is generally applicable to the remaining channels. It is, however, to be recognized that the scan rate for the different channels will differ significantly, which fact considerably complicates the difficulty of performing satisfactory tests.

In using the disk 10, as described in the above-referenced patents, a magnetic transducer head may be energized with an electrical signal to record a representation of the signal along the surface of the channel 14 as the disk 10 moves under the recording head. Thereafter, during a similar movement, the recorded signal may be sensed for utilization. In accordance with conventional use of disks 10 the signal density is quite high with the result that each minute area on the surface 12 must be satisfactory for recording and reproducing electrical signals. Generally, the difficulty with a defective area is either that it fails to record (signal dropout) or that it contains a permanently recorded signal which cannot be erased (pickup). As indicated, the amplitude standard for signals manifesting these defects varies significantly, as for example depending upon the radial position of the recording channel under consideration.

In accordance with the system hereof, considerable difficulties of the prior art are avoided by employing a single read-write transducer head to scan the channel 14 several times, during which it records and reproduces signals that clearly manifest defective areas in the channel. Specifically, the system as illustratively described herein operates according to an established pattern of alternate record (write) and sense (read) cycles.

During an initial recording cycle, segmental areas 16 (shaded) are recorded with an A.C. signal and are alternated with segmental areas 18 which are erased or cleared. During a following cycle of operation, the signal areas 16 are sensed and observed for dropout defects. Additionally, signals from the areas 16 establish a standard amplitude or test level for use during the periods when the areas 18 are scanned, to determine whether or not fatal pickup defects exist. That is, as an area 16 is scanned, a signal amplitude level is developed and stored or registered as a standard for use during the period when the following area is scanned. If a spurious signal is developed from an area 18 which exceeds the established standard, a fatal defect is indicated. Thus, the system may employ a single transducer head in a relatively economical arrangement, yet afford an appropriate standard for resolving defects productive of pickup spurious signals.

During the read cycle when the channel 14 is sensed to produce a test signal, areas adjacent the boundaries 20 lying between areas 16 and 18 are not observed for test. That is, areas adjacent the boundaries 20 are immune from test during the initial phases because these boundaries may provide false indications. After an initial phase of operation including a recording cycle and a sensing cycle, the roles of the areas 16 and 18 are reversed. That is, the two more cycles are provided during which the areas 16 are erased and the areas 18 receiving a recorded signal. Again, the recorded and erased signal areas are tested during a sensing cycle in which boundaries 20 are eliminated from consideration.

After the completion of two test phases of operation, each including a read cycle and a write cycle, the areas of consideration are shifted in staggered or offset relationship from those shown in FIGURE 1. Specifically, areas 16 are shifted so that one such area would lie between a pair of dotted lines 22. Along with this offset displacement, the initial phases of the test are repeated to extend the survey to include the former indicated boundaries 20. Of course, during the latter two phases boundaries again exist; however, the boundaries are now spaced-displaced to lie well within the areas previously tested.

At the conclusion of four phases of the test (each including one write and read cycle) the channel 14 is recognized as either satisfactory or fatally defective. If defective, remedial reject procedures will be pursued. Alternatively, if the channel is indicated to be satisfactory the system advances to the next following channel for a repeated sequence of tests. In this regard, the test phases resulting in the comprehensive evaluation of a channel may be performed in an exceedingly short interval of time by the system hereof with the result that considerable economy accompanies the effective testing capability of this system.

Preliminary to considering the detailed structure of the illustrative embodiment which accomplishes the above-described test program, it will be helpful to analyze some of the signals and timing relationships thereof, with respect to idealized waveforms. In this regard, the basis for timing and control operations is a permanently recorded magnetic record, sensed concomitantly with recording and sensing of each channel on the test record. Of course, the control record may take a wide variety of different forms and may provide different types of timing signals depending upon the specific logical organization employed; however, in the system hereof some simplicity in explanation results from disclosure of a multitrack control record providing several parallel timing signals in different conductors. Specifically, as shown in FIGURE 2*a*, a revolution pulse T1 occurs once each revolution of the control disk, and the test disk. Additionally, phase control pulses P1, P2, P3 and P4 are provided in four separate conductors to divide the recording rack or channel under test into discrete areas (space to time to space) either to be erased or receive a recorded signal. Signals are also developed to define the specific areas of erasing and recording with reference to time, and these signals are correlated to the magnetic recording disk in view of the substantially constant motion of the disk. That is, the time base of the signals is translated to a space base on the recording disk.

The distinct test phases of the operation are depicted by the waveforms of FIGURES 2*f*, *g*, *h*, and *i*. In these waveforms intervals of recording are designated by shaded areas while unshaded areas designate intervals of erase. The shaded areas actually indicate keyed periods of an A.C. signal which is recorded during an interval manifest by a signal AC while the unshaded sections designate intervals when a D.C. signal functions to erase or clear an area of the recording channel as manifest by the period of a signal DC.

Considering the operation in somewhat greater detail, a signal as depicted by waveform *d*, FIGURE 2*f* is first recorded in a recording channel. Then, during the following revolution, the signal of the waveform is sensed to provide a test signal. Thereafter, this operation is repeated with respect to signals as represented by the waveforms of FIGURES 2*g*, *h*, and *i* from which it is apparent that each area is tested for both pickup and dropout and furthermore redundancy is employed to cover boundary areas. Specifically, the intervals designated by the waveforms of FIGURES 2*f* and 2*g* cover one pattern of areas then the intervals indicated by the waveforms of FIGURES 2*h* and 2*i* cover staggered areas to pickup boundary areas.

Figure 2:
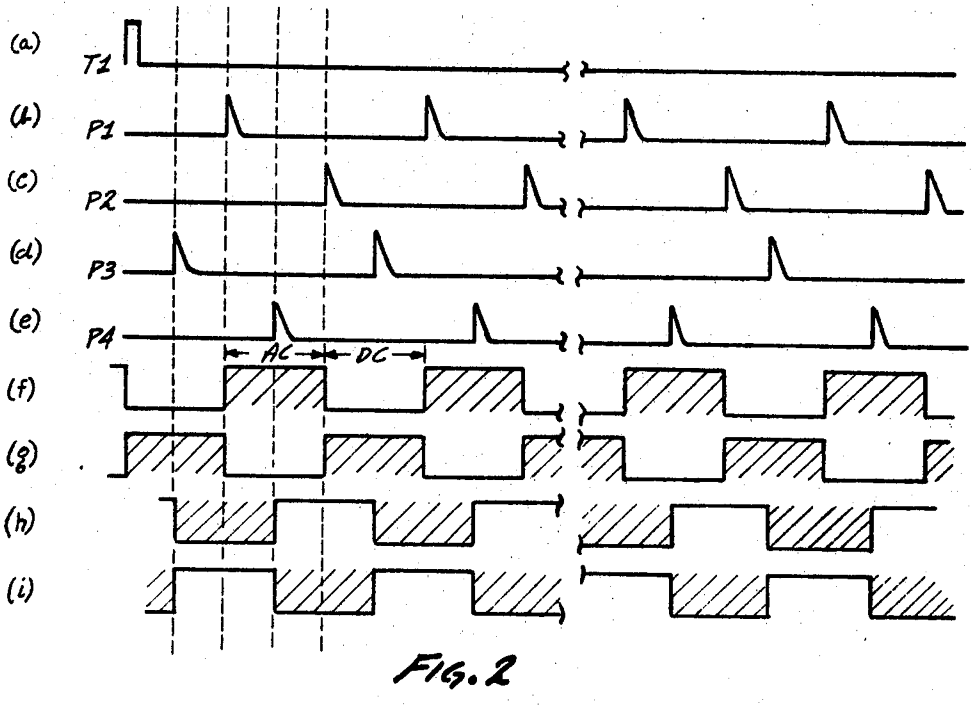
FIGURE 2 is a series of waveforms showing various signals and timing relationships existing within the illustrative system disclosed herein.
Figure 3:
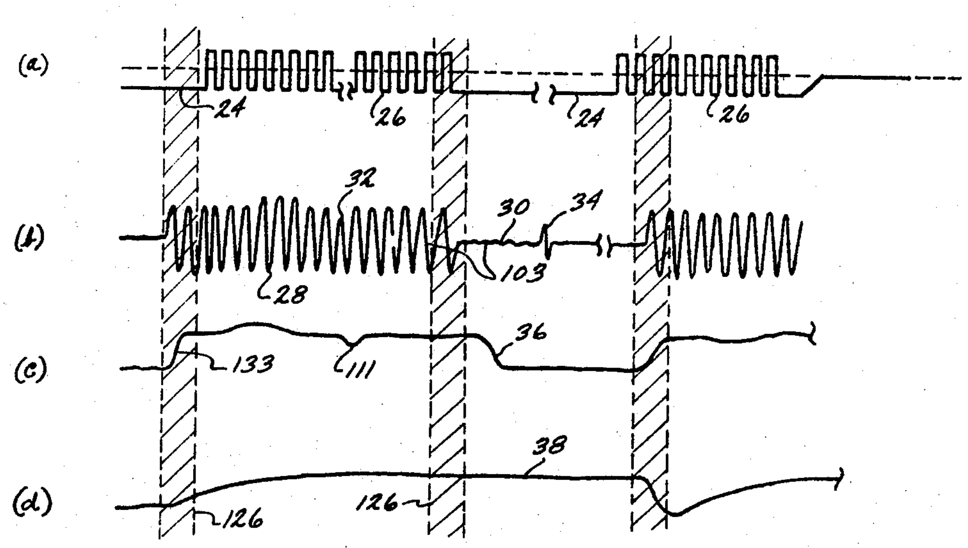
FIGURE 3 is another series of waveforms further indicative of the operation of the disclosed system.

The waveforms of FIGURE 3 are provided on an expanded time base in relation to FIGURE 2, for analysis of an individual cycle of recording and erasing, i.e., periods of A.C. and D.C. Specifically, the waveform of FIGURE 3*a* shows the idealized recording signals depicting erase periods 24 and record periods 26. The sensed signal is then represented by the waveform of FIGURE 3*b*, again showing related recording periods 28 and erase periods 30. In this regard, it is to be noted that an excursion 32 is substantially lower in amplitude than the average amplitude or envelope of this signal, indicating a defect. Such a reduced excursion indicates a dropout error. A pickup error is indicated in the waveform during the period 30 by a spurious signal excursion 34. The amplitude standard for determining whether or not the variations at points 32 and 34 indicate fatal defects is provided by the signal during the period 28. Amplitude standards are depicted by the waveforms of FIGURES 3*c* and 3*d*. That is, the waveform of FIGURE 3*c* shows the amplitude standard for analyzing the recorded signal during the period 28 and the waveform of FIGURE 3*d* shows the standard for pickup errors during the period 30.

The dropout standard signal 36 is developed as the average of the rectified sensed alternating signal, during the period 28 and adjusted to a desired standard. Thus, any substantial deviation, e.g., the deviation at point 32 (which drops below the signal 36) is manifest as a dropout defect. In a related fashion the pickup standard signal 38 is developed from the peaks of the recorded signal of the period 28, then stored as a reference for comparison with pickup deviations as excursion 34 in the observed signal. That is, any signal e.g., signal excursion 34 which exceeds the standard signal 38 manifests a pickup defect.

The various control signals employed in the system hereof to accomplish the waveforms set forth above, as well as the data or test signals are identified by letter and numeral designations. In this regard, the control signals, are generally binary in nature, having either a high or a low state. In accordance with accepted convention, the true state of a signal is indicated when the signal is in a high state. Furthermore, each of the binary signals has a negation which is inverted in form from the true signal. In accordance with standard, negation signals are indicated by the addition of a minus sign to the signal designation. The designations for the various signals appearing within the illustrative embodiments are tabulated in a chart below for convenient reference.

Chart I

A: When high designates the first period of test, including one write cycle and one read cycle.
B: When high designates the second period of test, including one write cycle and one read cycle.
C: When high designates the third period of test, including one write cycle and one read cycle.
D: When high designates the fourth period of test, including one write cycle and one read cycle.
T1: Timing signal, occurs at start of each cycle of the test disk and the timing disk.
P1: Timing signal phase 1.
P2: Timing signal phase 2.
P3: Timing signal phase 3.
P4: Timing signal phase 4.
RD: When high designates an interval of reading or sensing signals from the test medium.
WR: When high designates an interval of writing or recording signals on test medium.
AC: When high designates a period of recording A.C. test signals.
DC: When high designates a period of erasing the medium with D.C. signals.
T: Designates the test signal as recorded and sensed.
AN: Commands advance to next channel of disk for pursuing test.
E: Indicates confirmed error in recording.
BD: When high, designates boundary periods during which test is stopped.
Se: Head positioned and settled in operation.
R: Unconfirmed defect indicating rejection.
E: Confirmed defect.
DE: Indicates this equation is true:

$$B[(\text{A.C. signal})(WR)(AC)+(\text{Erase signal})\ (WR)(AC)]$$

Primarily, the signals defined and identified in the above chart are provided from a logic system 40 (FIGURE 4) upper center which may take a variety of forms one of which is considered in detail below. The system 40 receives a plurality of signals through a cable 42 from a record sensing or read system 44 which communicates with a timing or control disk 46. The system 44 may comprise a plurality of read heads, and associated amplifiers for processing independent signals from separate tracks as very well known in the prior art.

The control disk 46 carries a permanent record in several tracks and is mounted to be revolved by a shaft structure 48 mechanically connected to a drive unit 50. This apparatus may take the form of structure disclosed in the above referenced patent to Pattison, and/or the U.S. Patent 3,206,214, issued Sept. 14, 1965, to T. G. Leary.

The axial drive structure 48 also drives a test disk 52 so that the disks 46 and 52 move in locked synchronism. In practice, the disk 52 may comprise one of a plurality of disks incorporated in a single pack as well known in the prior art and as disclosed in the referenced patents; however, in presenting an illustrative system of the present invention the consideration of the single test disk 52 is adequate, recognizing that the disk may be one of a pack as well known.

The test disk 52 is operated in cooperation with a transducer head 54, as well known in the prior art, to record and sense signals in tracks or channels borne on the face of the disk. The head 54 is positioned to communicate with a select channel by a head-positioner structure 56 which may take the form of apparatus disclosed in the above referenced patent to Brunner. The head-positioner structure 56 is commanded to advance to the next channel by a signal appearing in a conductor 58 and thereafter indicates stability by the occurrence of a signal in a conductor 60. The output from the head positioner 56 to the conductor 60 may comprise simply the delayed inverse of an operating signal to manifest a very short interval of delay during which the head 54 becomes settled in operation with respect to a selected channel. Or, alternatively, the structure may comprise an electromechanical "tilt" mechanism to provide a high signal when the unit is at rest and without mechanical vibration.

Electrically, the head 54 communicates through a conductor 62 with a read-write amplifier 64 as well known in the prior art, which drives the head 54 in accordance with signals received through a conductor 66 or alternatively provides sensed signals from the head 54 to an output conductor 68. The amplifier 64 is commanded to function in a read, or write capacity by one or the other of the binary signals RD or WR being in a high state as applied through conductors 65 and 67 respectively.

The conductors 66 and 68 emerging from the amplifier 64 are connected to a control unit 70 which also receives various control and timing signals directly from the system 40. The control unit 70 also indirectly receives an erase signal in the form of direct current energy from a source 72 and a recording signal in the form of alternating current energy from a source 74. The sources 72 and 74 are connected through a gating structure generally indicated at 76 and inverter circuits 78 and 80 to the control unit 70. The operation of these units to accomplish the recording patterns as set forth in FIGURES 2*f*, 2*g*, 2*h* and 2*i* is considered in detail below.

Functionally, the control unit 70 operates by utilization of the various control signals to provide the desired signal for recording through the amplifier 64 to the head 54; and to thereafter, deliver a sensed form of that signal for test processing. Specifically, the signal to be recorded is applied from the control unit 70 to the conductor 66 while the signal to be evaluated is applied from the control unit 70 through a conductor 82 to a rectifier 84. The output of the rectifier 84 is in turn connected to three test circuits 86, 88 and 89 which analyze the sensed-and-rectified signal for dropout, pickup and basic recording defects.

Specifically, the circuit 86 analyzes intervals of A.C. signal recording for manifestations of dropout defects while the circuit 88 analyzes intervals of erased signals for manifestations of pickup defects. The test circuit 89 verifies the sensed signal to be continuously within a tolerable range. The output signals (defect indicating) from these circuits are provided to an error register means generally indicated at 90 which functions either to: reject a test record 52 on the basis of a fatal defect, or advance the pattern of test operation.

In view of the above preliminary structural description of the system, along with the general philosophical description thereof, an understanding of the operation may now best be accomplished by assuming an initial stage of testing a particular channel, and proceeding with the explanation and introduction of component elements in greater detail concurrently with the explanation of the progressing sequence of operation. Therefore, assume that the head 54 (FIGURE 4) has just been positioned in the channel 14 (FIGURE 1) and is scanning the channel. Shortly thereafter, a signal S*e* appears in the conductor 60 (FIGURE 4), upper left indicating to the logic system 40 that the head 54 is properly positioned, settled and ready to start the test. Thereupon, the system 40 provides a high state of the signal A, which signal is applied to a pair of "and" gates 92 and 94. These gates are represented by a somewhat-conventional symbol indicating a plurality of inputs and a single output. Functionally, the gates process binary signals and provide the output signal high at a time when every one of the input signals is high. A wide variety of structures for performing such a function are well known in the prior art, one of which is shown and described in United States Patent 3,274,376, issued Sept. 20, 1966, to D. C. Evans et al.

At the assumed stage of operation, the gates 92 and 94 both receive the signal A (a qualifying value which is high during the first stage of operation including a single write cycle and a single read cycle). The gates 92 and 94 also receive a signal WR from the system 40 which is high to qualify these gates during a single revolution of the disk 52. Thus, the gates 92 and 94 are qualified during the initial cycle of operation by a disk 52, during which the sequentially alternate periods of erase and record are provided by the gates.

The gate 92 is connected through two paths to the source of record signal 74. Specifically, the record signal from the source 74 flows through an "and" gate 96 to the gate 92 during the periods defined by signals A and B (depicted in the waveforms of FIGURES 2*f* and 2*g*). During the periods defined by the signals *c* and *d* (depicted in the waveforms of FIGURES 2*h* and 2*i*, the record signal passes through the "and" gate 97 and the inverter 78 to the gate 92. The inverters 78 and 80 function to reverse a signal on polarity and various well-known structural embodiments are well known as described in the above-referenced patent to Evans et al.

Figure 4:
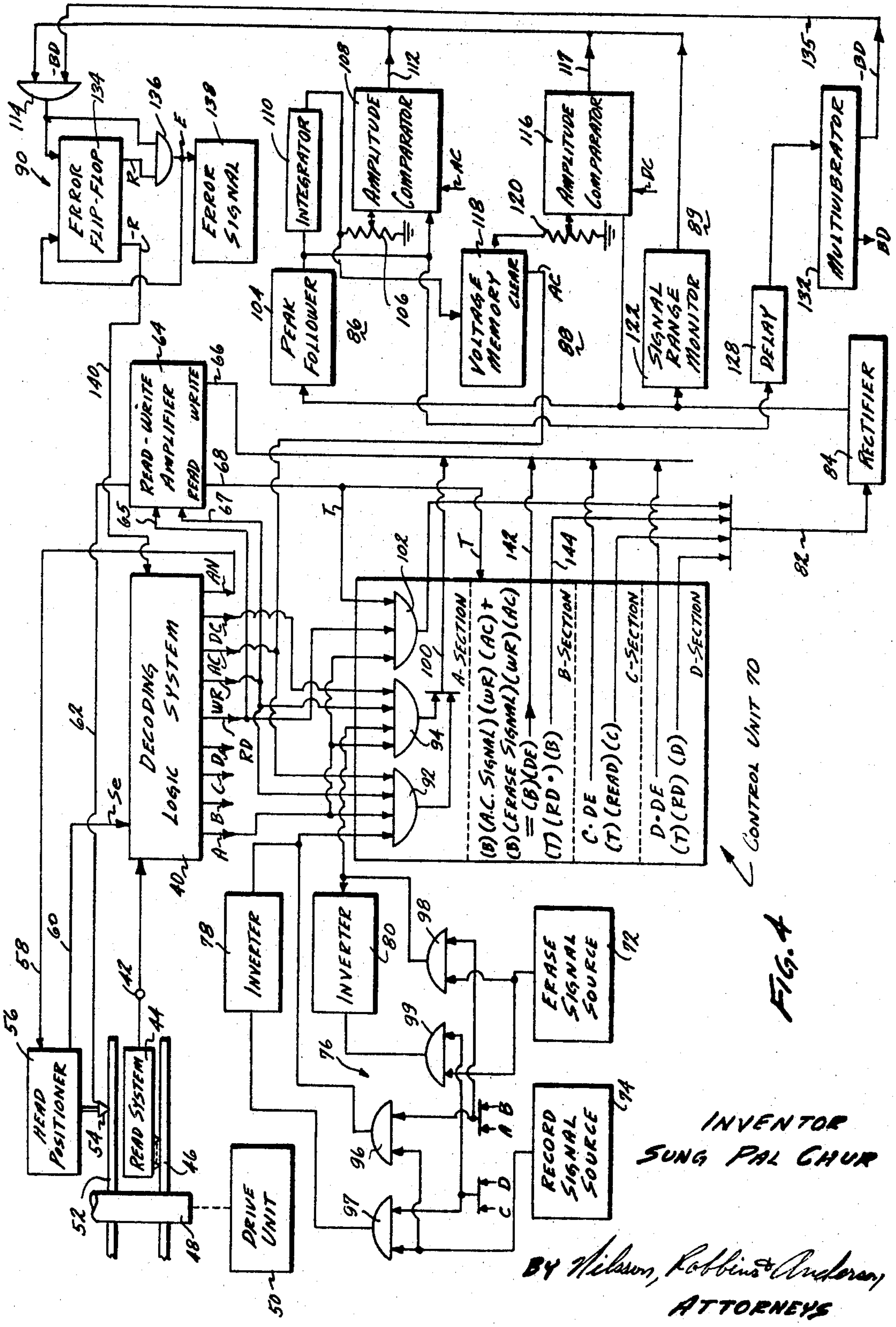
FIGURE 4 is a schematic and block diagram of a system constructed in accordance with the present invention.

Recapitulating, during this initial operation (period of signal A) the recording signal is applied to the qualified gate 92 as an alternating current and passes through the gate 92 during the record intervals defined by a high state of a signal AC (FIGURE 2*f*) which is also applied from the system 40 to the gates 92. In a related manner the source 72 (lower left) of a direct-current signal supplies an erasing current through an "and" gate 98 to the "and" gate 94. The gate 94 is qualified in alternate sequence with the gate 92 by a signal DC, so that the combined outputs from the gates 92 and 94 appearing in a conductor 100 takes a form as shown in waveform of FIGURE 2*f*. That signal is applied from a conductor 100 through the conductor 66 and the amplifier 64 to be recorded over the full length of the channel 16 (FIGURE 1) on the disk 52 (FIGURE 4). It is to be noted that the termination of the signal WR, (lasting for one disk cycle) terminates the recording interval.

Recapitulating, at the completion of the first cycle of revolution by the disk 52, the disk is uniformly recorded with intervals of signals of a predetermined length separated by blank spaces of similar length that have been fully erased. This pattern of the channel is complete and continuous and is substantially as depicted by the waveform of FIGURE 2*f*.

After the cycle during which the pattern is recorded, the signal WR (commanding a write operation) ceases; however, the signal A continues at a high level. Shortly thereafter, the read signal RD goes high, thereby qualifying an "and" gate 102 (in the A section of control unit 70) which, during this period is also qualified by the high signal A. As a result, the amplifier 64 is now conditioned by the read signal RD and functions to read the contents of the track or channel by utilization of the head 54 as well known in the prior art, to provide a signal to the conductor 68 representative of the sensed signal. After amplification, the sensed signal T passes through the gate 102 for application through conductor 82 to the rectifier 84. Prior to rectification, this signal may be as depicted in the waveform of FIGURE 3*b*, comprising bursts of alternation current signal separated by substantially void spaces.

The test evaluation signal T is rectified by the rectifier 84 to provide essentially the upper half thereof, i.e., the portion lying above the reference level 103 (FIGURE 3*b*). The two distinct sections of the signal (the A.C. sections and the void erased sections) are then analyzed respectively by the circuits 86, 88 and 89. Specifically, the sensed rectified A.C. signals are applied to the circuit 86. That is, the rectified signal passes through a peak follower 104, an integrator 110 and a potentiometer 106 to an amplitude comparator 108 and is also applied directly from the follower 104 to the comparator 108. The peak amplitude follower or circuit 104 develops an output to the amplitude comparator 108 which is represented by the waveform of FIGURE 3*c*. Then the action of the amplifier integrator 110 on that waveform is to omit slight irregularities by smoothing the signal. Therefore the output from the integrator 110 does not contain the deviation 111 of FIGURE 3*c*.

In operation, the peak follower circuit 104 functions basically as a demodulator or detector as employed in A.M. radio receiver systems and various forms thereof may be employed as this component.

The integrated signal from the potentiometer 106, is the peak envelope signal reduced to a smooth standard against which the peak signal is compared. That is, if the amplitude of the peak signal drops below a level established by the integrated signal from the potentiometer 106, a defect is indicated. Graphically, as shown in FIGURES 3*b* and 3*c*, the defect indicated at point 32 would be manifest as the rectified peaked form of the signal (FIGURE 3*c*) would drop below the standard integrated signal. Thereupon, the comparator 108 provides an output signal to the conductor 112 indicating a defect in the disk 52.

It is to be noted, that the amplitude comparator 108 is conditioned for operation only during the interval of the signal A.C. and therefore functions to detect a dropout defect during that test period, manifesting such an occurrence by a pulse in the conductor 112 which is applied to an "and" gate 114.

The amplitude comparator, in providing an output pulse to conductor 112 during intervals of the signal AC, if the peak envelope signal drops below the integrated signal may take the form of a simple threshold device, e.g. thyratron appropriately biased and with applied signals properly poled. Alternatively, an analog comparator may be employed in certain of the various forms thereof as well known in the computer art. Recapitulating, an output pulse flows from the comparator 108 during the test period of signal AC anytime the adjusted signal from the potentiometer 106 drops below the level of the signal from the integrator 110.

Just as the circuit 86 operates to detect dropout errors during the period established by the signal AC, the circuit 88 functions during the period of signal DC to manifest pickup errors. Specifically, the rectified test signal T (from the rectifier 84) is applied directly to an amplitude comparator 116. Additionally the integrated peak signal from the integrator 110 is applied through a voltage memory 118 and a potentiometer 120 to the amplitude comparator 116. The voltage memory 118 may comprise various well-known circuits, e.g., a capacitor (or various other memory circuits) driving a cathode follower to provide a continuing signal somewhat representative of the average peak value attained by the signal from the integrator 110.

The voltage memory 118 is reset or cleared by the signal AC and then attains a standard state somewhat as depicted in the waveform of FIGURE 3*d*. It is this signal, developed by the voltage memory 118 which provides the standard for determining pickup errors of sufficient magnitude to reject a disk. Specifically, if the pickup signal provided from the rectifier 84 (point 34, FIGURE 3*b*) exceeds the registered adjusted potential contained by the memory 118 a defective disk is indicated. Relating function to this structure, the amplitude comparator 116 provides an output to the "and" gate 114 any time the signal from the rectifier 84 exceeds the potential provided from the potentiometer 120. In effect, a fatal defect is indicated any time the excursion at point 34 (FIGURE 3*b*) exceeds the amplitude of the standard from the voltage memory 118 (FIGURE 3*d*) as adjusted. Thereupon, an error pulse is provided through conductor 117 to the gate 114.

As another criterian, the output from the rectifier 84 is applied to a signal range monitor 122 which is essentially threshold circuit and may comprise various forms of threshold circuits as the well known Schmidt trigger. Functionally, the monitor 122 provides an output to the "and" gate 114 any time the range of the signal amplitude from the rectifier 84 exceeds a predetermined level. Thereupon, an excessive amplitude-indicating signal indicates a defect.

It may therefore be seen that three distinct criterian are used to manifestation of errors. Specifically, a signal is supplied to the gate 114 any time a pickup error exceeds a predetermined level, a dropout error is below a predetermined level or the range of signal T exceeds a predetermined level. In any of these instances, during a test interval, the gate 114 is qualified. That is, except during intervals of the boundary signal when test is suspended the defects are manifest. The intervals of the boundary signal are indicated by shaded areas 126 in FIGURE 3 and as explained above are defined by a signal BD. Therefore, as the gate 114 is qualified by the signal —BD, it passes an error signal except during boundary periods, i.e., between the times established by the signal AC and the signal DC.

The boundary signal is generated from the peak follower signal of the follower 104 (FIGURE 3*c*) which is applied through a delay circuit 128 to a multivibrator 132. The multivibrator 132 is a monostable unit as is well known in the prior art. As a result, the multivibrator 132 is triggered shortly after the occurrence of the leading edge 133 of the waveform of FIGURE 3*c* and remains triggered to provide a high signal —BD in a conductor 135 for the interval of the test as indicated between the shaded areas 126 in FIGURE 3.

The conductor 135 carrying the signal —BD indicative of an individual test interval is applied to the gate 114 along with any of the signals as previously considered which indicate a positive defect. As a result, the "and" gate 114 is qualified to set a flip-flop 134 any time a defect of rejection significance is indicated. Upon setting the flip-flop 134, the system functions to repeat the last test cycle to confirm the defect. If the defect is not confirmed the system proceeds as though the defect were never indicated. However, if the defect is confirmed, a defective signal E indicating a rejection is developed which triggers an alarm for manual or other action.

The structure accomplishing this operation involves an "and" gate 136 which receives the unconfirmed error signal R from the flip-flop 134, along with a signal from the gate 114 indicating a second detection of the error. Upon qualification of the gate 136, the confirmed signal E is provided to an error-signaling apparatus 138 to provide an audible signal. Concurrently, the signal E is returned to the flip-flop 134 resetting the circuit preparatory to another phase of operation.

In the event a cycle of testing is completed, e.g., the phase indicated by the signal A, and no errors are detected, the system automatically proceeds with the next phase of the test. The absence of an error is indicated by the application of the signal —R from the flip-flop 134 through a conductor 140 to the decoding and logic system 40. Thereupon, the signal A ceases to be high and the signal B goes high. The details of the structure for performing this change are discussed below with reference to FIGURE 5.

During the period of the high level of signal B, the system accomplishes a sequence of test signals as depicted in the waveform of FIGURE 2*g*. The signal pattern for recording is provided from the B section of the control unit 70 by a gate structure similar to that shown in the A section. However, to simplify the presentation, rather than to repeat the gate structure, the logic equation therefore is set forth. Specifically, the recording sequence is defined by:

$$(B)(\text{A.C. signal})(WR)(AC)+(B)(\text{erase signal})$$
$$(WR)(AC)=(B)(DE)$$

This equation defines the operation of "and" gates similar to the gates 92 and 94 and provides an output to a conductor 142 substantially as depicted by the waveform of FIGURE 2*g*, wherein the shaded portions of the waveform represent an A.C. signal to be recorded. Additionally, each section of the control unit 70 also controls the application of the test signal sensed from the disk under test to the rectifier 84. Specifically, in the A section this operation is controlled by the "and" gate 102 as described above and similar gates are provided in the B section, the C section and the D section. The equation representative of the function of this gate is: $(T)(RD)(B)$. The equation is shown in the figures and indicates the test signal output to a conductor 144.

The signals passed through each section of the control unit 70 during the intervals of the timing signals A, B, C and D (as indicated above) are substantially as depicted in the waveforms of FIGURES 2*f*, 2*g*, 2*h*, and 2*i*, respectively. Therefore, during the period designated by the signal B, the change involves interchanging the intervals of the A.C. signal recording with the periods of D.C. erasing. This function is accomplished by the decoding logic system 40 which now phase inverts the relationship of the signals AC and DC from their prior phase. As indicated, the detailed structure of the system 40 is set forth below. However, recognizing the phase inversion between the signals AC and DC, it is apparent that the gates in the B section of the control unit 70 will function to pass the phase-inverted intervals of recording signal and erase signal to the conductor 142 for passage through the amplifier 64 to be recorded in the channel undergoing test by the head 54.

As during the previous test interval, the completion of a cycle recording is manifest by the signal WR ceasing after which the signal RD becomes high driving the amplifier 64 to read signals from the channel through the conductor 68 for passage out of the control unit 70 in the conductor 144 to the rectifier 84. Subsequently, the testing operation is performed substantially as set forth above. That is, intervals of the recorded signal are tested against a standard for dropout defects and are tested on the basis of peak amplitude for defects manifest by an excessive signal range . Furthermore, during intervals when the test signal T manifests an erased section, the test operation involves checking for pickup defects by testing the signal against a registered signal supplied from the voltage memory 118. It is to be noted in this regard, that at the conclusion of each interval of testing for pickup defects, the voltage memory 118 is reset by the signal AC provided from the logic system 40.

At the completion of the record cycle portion of the interval signal B and the sensing cycle thereof, the detection of no errors permits the system for proceed. Of course, as explained above, on the contrary if defects are detected the test cycle is repeated.

Assuming the test period manifest by the signal B indicates no defects, the signal B from the system 40 goes to a low state while the signal C becomes high to develop waveform from the control unit 70 substantially as depicted in FIGURE 2*h*. In this regard, the period or phase of the test intervals is now staggered or offset and the polarity or sense of the recording and erasing signals is inverted. The required inversion is accomplished by the inverter circuits 78 and 80. That is during the periods of the signals A and B, the gates 96 and 98 are qualified so that the record signal from the source 74 and the erase signal from the source 72 are passed directly to the control unit 70. However, during the interval of the signal C (as well as the signal D), the gates 97 and 99 are qualified with the result that the signals from the sources 72 and 74 are passed through the inverters 78 and 80. Specifically, for example, the signal from the source 72 passes through the gate 97 and the inverter 78 to the control unit 70 to be treated as the A.C. signal. Somewhat similarly, the signal from the source 72 now passes through the gate 99, and the inverter 80 to be treated as the erase signal within the control unit 70.

In other regards, the operation of this system during the intervals of signals C and D are generally similar to the operation described above except for the staggered timing relationship to cover areas previously designated as boundaries. This staggered or offset timing relationship is accomplished by a shift in the phase or period of the signals AC and DC, as provided from the system 40. Thus, the system proceeds to accomplish the four independent phases of periods of the test designated by the signals A, B, C, and D, each of which includes a recording cycle and a sensing cycle involving waveforms substantially as shown in FIGURES 2*f*, 2*g*, 2*h* and 2*i*. Of course, as described above, if a defect in the recording disk 52 is observed and confirmed, an error signal is activated commanding manual or other tension as to remove the disk 52 as a reject. Alternatively, if the channel test is completed with the detection of no confirmed defects, the system produces a signal AN indicating this fact which signal is applied to the head positioner 56 causing that structure to advance the head 54 to the next channel in sequence, thereby progressing with the test operation. The signal AN results on conclusion of a channel test interval in which no confirmed defects are indicated and is generated by the decoding logic system 40 as shown in detail in FIGURE 5.

As indicated above, the decoding logic system 40 (FIGURE 4) functions to provide the timing signals for operation of the system, under control of the signals sensed from the control disk 46 by the read system 44. As indicated, these basic timing signals include the phase signals P1, P2, P3 and P4 as well as the cycle timing signal T1 all of which are shown in FIGURE 2. The cyclic timing signal T1 occurs once each revolution of the control disk 46 while the timing signals or phase signals P1, P2, P3 and P4 are recorded in a continuous pattern in staggered phase relationship as shown.

Figure 5:
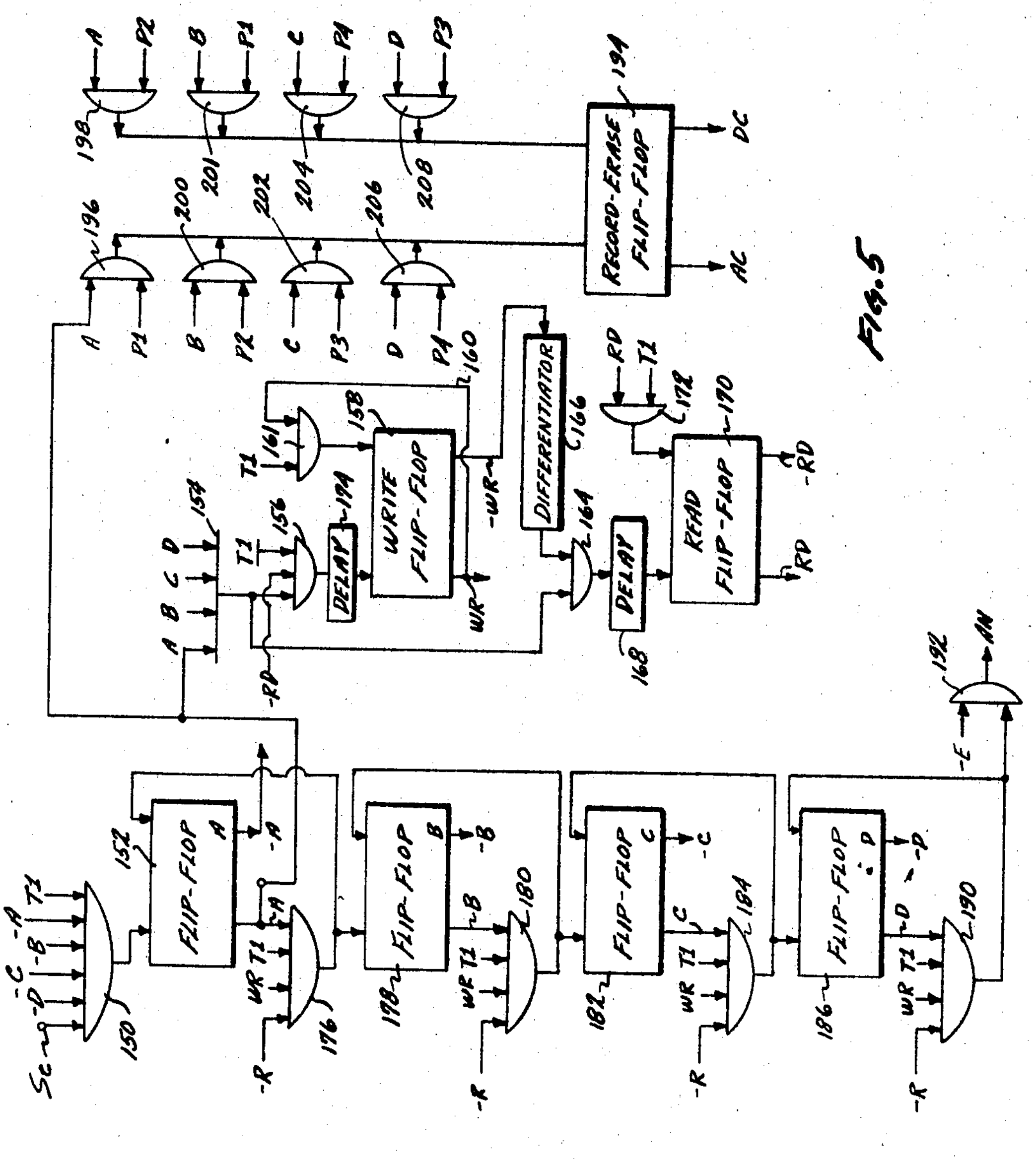
FIGURE 5 is a schematic and block diagram of a complement of the system of FIGURE 4.

In addition to the basic timing signals provided from the control disk 46, the system 40 also utilizes various signals developed within the system and within that structure. Specifically, for example, the system 40 employs the signal S*e* from the head positioner 56 which manifests the fact that the head 54 has settled and is operating in a fresh channel. In fact, the signal S*e* initiates a channel testing period, acting through an "and" gate 150 (FIGURE 5, upper left).

The gate 150 is qualified by the negation signals —A, —B, —C and —D, indicating that no test phase is in progress. Under such conditions, the occurrence of the signal S*e* indicating head operation is stable results in the qualification of the gate 150 upon the occurrence of the timing signal T1 indicating the initiation of a cycle of revolution by the disk under test. Thereupon, the gate 150 passes a signal to a flip-flop 152 which develops the signal A (and the negation signal —A) as shown. It is to be noted, that in FIGURE 5 as herethroughout all connections within the systems are designated by code letters; however, some connections are dropped from the drawings in the interests of maintaining the drawings legible.

Upon qualification of the gate 150 to set the flip-flop 152, the signal A is provided high through a write cycle indicated by the signal WR being high, and a read cycle indicated by the signal RD being high. Considering the development of these signals, the signal A from the flip-flop 152 is applied through a connection gate 154 (along with signals B, C and D) to an "and" gate 156. The gate 156 is also qualified by the timing signal T1 so that at the first occurrence of the signal T1 after the appearance of the signal A in a high state, the gate 156 passes a signal to a flip-flop 158 setting that unit to provide the WR high. The signal WR remains high for one revolution of the disk after which that signal resets the flip-flop 158 through a conductor. 160 acting through a gate 161 which is qualified by the timing signal T1. Simultaneously, upon the flip-flop 158 being reset to provide the negation signal —WR high, an "and" gate 164 is qualified by the signal —WR acting through a differentiator circuit 166 which provides a pulse from the leading edge of the signal —WR. The gate 164 is qualified by a signal from the connection gate 154 indicating a test cycle is in progress and after a brief delay accomplished by a delay circuit 168 a read flip-flop 170 is set to provide the signal RD high. The delay provided by the delay circuit 168 accomplishes a brief interval between the conclusion of the signal WR and the initiation of the signal RD. A similar delay is provided in the reverse exchange by a delay circuit 174 provided in the setting circuit for the flip-flop 158. These delay intervals afford a spaced relationship between the signals WR and RD, avoiding confusion and accommodating phase displacements in the actual test signal.

Upon the conclusion of the high state of the signal

RD, from the flip-flop 170, the gate 156 may again be qualified to act through the delay circuit 174 to set the flip-flop 158. Upon such an occurrence the signal WR is again provided in a high state which immediately shifts the stage of operation from that indicated by the signal A to that indicated by the signal B. Specifically, the signal WR is applied to an "and" gate 176 (FIGURE 5, upper left) which is now qualified by the signals A, T1, and —R to set the flip-flop 178 providing the signal B in a high state. It is to be recalled that the signal —R indicates that no errors or significant defects were detected during the prior stage of operation. The interval designated by the high state of signal B is processed and terminated substantially as explained above with respect to the development of the signal A. That is, at the conclusion of a full write cycle and a full read cycle a gate 180 is qualified to reset the flip-flop 178 under the control of signals —R, WR, T1 and B. As a result, the high state of the signal B is terminated and a flip-flop 182 is set to provide a high state of the signal C. Again, a timed interval is terminated by qualification of a gate circuit, in this instance the "and" gate 184 to terminate the high state of the signal C and in turn set a flip-flop 186. With the setting of the flip-flop 186 the signal D becomes high and so remains until that phase of the test is completed after which an "and" gate 190 is qualified. Thereupon, the flip-flop 186 is reset and a qualifying signal is applied to an "and" gate 192 along with a negation signal —E. The signal E indicates a confirmed defect in the disk; therefore, the negation thereof indicates no defects and in such an instance at the conclusion of a complete test period, the gate 192 is qualified to provide the signal AN high commanding the advance to the next channel to be tested. In this manner, the system is again returned to a state from which the sequence of signals A, B, C and D are provided to indicate the individual test intervals.

In addition to providing the signals considered above, the decoding logic system 40 as depicted in FIGURE 5 also provides the signals AC and DC which designate the periods of recording a signal and erasing the track or channel. These signals are provided from a flip-flop 194 (FIGURE 5, lower right). The phase relationship of the signals AC and DC is determined in accordance with the phase signals P1, P2, P3 and P4 along with the signals A, B, C and D. In this regard, referring preliminarily to FIGURE 2, it is to be noted with respect to FIGURE 2*f*, that the signal AC is to be provided high during the high interval of the signal A between the phase pulses P1 and P2. In a related aspect, the signal DC is to be provided high during the interval of signal A between the phase pulse signals P2 and P1. This relationship is accomplished by "and" gates 196 and 198 (FIGURE 5, upper right). That is, the gate 196 is qualified during the interval of signal A being high upon each occurrence of the phase signal P1 to thereupon set the flip-flop 194 in a state to provide the signal AC high. Somewhat similarly, the gate 198 is qualified during the interval of signal A upon each occurrence of the signal P2 to reset the flip-flop 194 establishing the signal DC high. Therefore, the flip-flop 194 is oscillated to provide the signal pattern as shown in FIGURE 2*f*.

During the interval established by the signal B being in a high state, the test signal must be formed by intervals of signals AC and DC as shown in the waveform of FIGURE 2*g*. Such timed operation is accomplished by "and" gates 200 and 201 utilizing the timing signals P1 and P2 in inverse relationship from that described above. In a similar manner, "and" gates 202 and 204 control the flip-flop 194 during the interval of signals C and "and" gates 206 and 208 accomplish that function during the interval of signal D. Thus, the phase signals P1, P2, P3 and P4 comprising timing impulses function in cooperation with the stage-timing signals A, B, C and D to properly oscillate the flip-flop 194 to accomplish the signals AC and DC in the timing relationship as shown in FIGURE 2.

The system hereof has thus been described in the presentation of an illustrative embodiment. A basic and very important advantage of the system resides in the structure for developing a test standard for spurious pick-up signals, which standard is derived from the pertinent portion of the disk under test and is current to the test. This advantage of the system stems from the sequential record-erase pattern established in a recording channel or track undergoing test. Of further significance to this basic technique is a somewhat concurrent testing for drop-out defects. Additionally, various other advantages stem from the repeated cyclic testing operations with phase and sequence variations, along with the automatic control afforded by a system hereof.

Of course, various other advantages of this system will be readily apparent to those skilled in the prior art from their consideration of the illustrative embodiment described herein. Of course, variations from that embodiment will also be readily apparent to persons skilled in the art; therefore, the scope hereof is not to be limited by the detailed embodiment described but rather shall be determined in accordance with the claims as follows.

What is claimed is:

1. A testing system for a recording member, comprising:
- recording means for recording signals along a test track of said recording member;
- means for alternately driving said recording means to record a test signal and to clear said recording member whereby alternate sections of a test track are recorded and cleared;
- means for sensing said test track to provide alternate intervals of test signal and clear signal; and
- comparison means connected to receive signals from said means for sensing, for comparing a component of said test signal with a component of said clear signal to provide an indication of said test track.

2. A system according to claim 1 wherein said recording member comprises a magnetic recording member and said recording means and means for sensing include means for imparting relative motion between said magnetic recording member and an element of said recording means and said means for sensing.

3. A system according to claim 2 wherein said comparison means includes a signal memory for storing one of said signals whereby to accomplish time concurrence between said component of said clear signal and said component of said test signal.

4. A system according to claim 3 wherein said comparison means further includes means for providing a rejection signal upon the occurrence of said component of said clear signal exceeding a predetermined amplitude relative to said component of said test signal.

5. A system according to claim 4 wherein said comparison means further includes means for detecting fluctuations of predetermined amplitude, in said test signal to provide said rejection signal.

6. A system according to claim 5 further including means inactivate said means for providing a rejection signal during discrete intervals separating said alternate intervals of said test signal and clear signal.

7. A system according to claim 6 further including means to accomplish plural sequential test phases of said test track, and including means to offset said alternate sections of said test track during one test phase from positions of a prior phase.

8. A system according to claim 2 including means, connected to be controlled by said comparison means, for providing a rejection signal manifesting a defect in said test track.

9. A system according to claim 8, further including means inactivate said means for providing a rejection signal during discrete intervals separating said alternate intervals of said test signal and clear signal.

10. A system according to claim 9, further including means to accomplish plural sequential test phases of said test track, and including means to offset said alternate sections of said test track during one test phase from positions of a prior phase.

References Cited

UNITED STATES PATENTS

| | | | |
|---|---|---|---|
| 2,854,624 | 9/1958 | Lubkin et al. | 324—34 |
| 2,870,430 | 1/1959 | Hancock | 324—34 |
| 2,922,106 | 1/1960 | Oates et al. | 324—34 |
| 3,071,723 | 1/1963 | Gabor | 324—34 |

FOREIGN PATENTS

| | | |
|---|---|---|
| 1,066,472 | 4/1967 | Great Britain. |

OTHER REFERENCES

Gibbs, N.: Problems Involved in Magnetic Tape Recording, Audio, March 1954; pp. 19–21 and 52.

Jack, R.: Evaluation of Magnetic Tape, Instruments and Control Systems, July 1962, pp. 154–158.

Wherry, D.: Magnetic Tape Tester Finds the Dead Spots, Radio-Electronics, November 1962, pp. 52–54.

RUDOLPH V. ROLINEC, Primary Examiner

R. J. CORCORAN, Assistant Examiner

U.S. Cl. X.R.

179—100.2; 340—174.1